United States Patent [19]

Zimmermann

[11] Patent Number: 5,765,987
[45] Date of Patent: Jun. 16, 1998

[54] AUTOMOBILE TRUNK LOAD AND UNLOAD ASSIST DEVICE AND METHOD

[76] Inventor: Jacqueline E. Zimmermann, 60243 Trailwood, Washington, Mich. 48094

[21] Appl. No.: 728,442

[22] Filed: Oct. 10, 1996

[51] Int. Cl.[6] .................................................. B65G 67/00
[52] U.S. Cl. ............................................ 414/786; 414/462
[58] Field of Search ......................... 414/462; 187/273, 187/274, 275; 108/44, 147; 224/499, 497, 550; 211/187; 248/157, 419, 172

[56] References Cited

U.S. PATENT DOCUMENTS

| | | | |
|---|---|---|---|
| 2,014,019 | 9/1935 | Girl | 414/462 |
| 2,381,664 | 8/1945 | Hansen | 187/274 |
| 2,545,269 | 3/1951 | Ford | 224/497 |
| 3,103,290 | 9/1963 | Perri | 414/462 |
| 3,365,084 | 1/1968 | Fernicola | 414/462 |
| 3,627,158 | 12/1971 | Kobasic | 414/462 |
| 4,455,948 | 6/1984 | Torres | 414/462 |
| 4,577,821 | 3/1986 | Edmo et al. | 108/147 |
| 4,725,183 | 2/1988 | Smillie, III | 414/462 |
| 4,799,849 | 1/1989 | Miller | 414/462 |
| 4,969,793 | 11/1990 | Pawl | 414/462 |
| 5,054,578 | 10/1991 | Smillie, III et al. | 414/462 |

FOREIGN PATENT DOCUMENTS 2157258  10/1985  United Kingdom ............ 414/462

*Primary Examiner*—Karen M. Young
*Assistant Examiner*—Douglas Hess
*Attorney, Agent, or Firm*—Vanophem Meehan & Vanophem, P.C.

[57] ABSTRACT

A device to assist in loading and unloading objects into and from the trunk compartment of an automotive vehicle, the device having a lower platform supported on the floor of the trunk compartment, an upper platform positioned above the lower platform, a plurality of vertically extensible pneumatic operators for supporting the upper platform on the lower platform, an accumulator containing pressurized air, and a piping system for connecting the accumulator to each of the pneumatic operators to simultaneously extend each of the pneumatic operators and thereby lift the level of the upper platform with respect to the lower platform to a level at which objects can be transferred to and from the trunk compartment by a sliding action. An electric air pump is also provided to introduce pressurized air into the accumulator, and a safety switch is provided to prevent lifting the upper platform while the trunk is closed. The upper platform is provided with a multitude of horizontally extensible slides, to permit the surface area of the upper platform to be increased, and a pair of openings to permit the compact device to be placed into, and removed from, the trunk compartment of a vehicle.

2 Claims, 1 Drawing Sheet

5,765,987

AUTOMOBILE TRUNK LOAD AND UNLOAD ASSIST DEVICE AND METHOD

BACKGROUND OF THE INVENTION

1. Field of the Invention

This invention relates to a device which is inserted into the trunk of an automotive vehicle and assists in the loading of heavy objects into the vehicle trunk and in the unloading of such objects from the trunk.

2. Description of the Prior Art

Modern automotive vehicles are provided with large capacity trunks to permit the vehicles to be used to transport luggage and other heavy objects. However, the loading of heavy objects into the trunk of a vehicle, and the unloading of heavy objects from the trunk, is physically challenging to the person doing such loading or unloading. This loading and unloading requires lifting, bending and reaching motions typically under heavy load, which can be beyond the physical capabilities of such person or even injurious to the back or extremities of such person. Problems with loading and unloading the vehicle trunks are especially troublesome to elderly persons and to injured or physically disabled persons.

Prior artisans have proposed various types of trunk loading devices to assist in the loading of heavy objects into the trunk of an automotive vehicle, and in the unloading of heavy objects from the trunk, including the devices described in U.S. Pat. Nos. 4,969,793 (Pawl), 4,799,849 (Miller), 4,073,395 (Clement) and 3,011,669 (Sylvester). Unfortunately, devices such as these involve exposed, connected or closely adjacent mechanical elements, such as scissors-type elements, that move relative to one another, thereby posing significant risks of serious injuries to the fingers or hands of the person using such devices.

Due to the designs of the prior art, it is possible for a person, and in particular a child or elderly person, to receive injuries from getting a finger pinched in the lifting mechanism, it is even possible to have a finger completely severed.

Furthermore, these prior art devices require a significant amount of space and are typically very heavy due to the motors, gears, linkage and other heavy metal parts required by their design. The prior art designs also typically require that the lift mechanism be bolted to the floor of the trunk requiring significant amounts of time and effort as well as cost. Thus, the prior art lacks a lift mechanism for use in the trunk of an automobile which is lightweight and reduces the risk of injury to an operator.

SUMMARY OF THE INVENTION

According to the present invention, there is provided a device for insertion into the trunk of an automotive vehicle that assists in loading heavy objects into the trunk, and in unloading such objects from the trunk, and in doing so without exposing the person loading or unloading the trunk to pinch injuries to fingers or hands from contact with connected or closely adjacent mechanical elements that are moving relative to one another. Further, the present invention, at the same time, provides a device which is significantly more compact, lighter and portable than the prior art designs.

The apparatus according to the preferred embodiment of the present invention is made up of a pair of spaced apart, horizontally extending platforms that can fit within a vehicle trunk on the floor of the trunk. The upper platform is supported on the lower platform, which is directly supported on the floor of the trunk or on an intermediate member, by a multitude of linearly acting pneumatic actuators, such as a bellow pneumatic cylinders, for example, three of such pneumatic actuators. The upper platform can be raised and lowered with respect to the lower platform by the simultaneous pressurization or depressurization of the pneumatic actuators. The upper platform, preferably, is provided with a multitude of slides along its opposed sides which are retracted when the apparatus is inserted into the trunk and can then be extended within the trunk to permit its surface area for supporting various objects to be selectively increased, if and when desired. In the depressurization condition of the pneumatic operators of such device, the spacing between the upper platform and the lower platform can be maintained at a suitably low value, for example, one and one-half to two and one-half inches, to avoid taking up an undue portion of the volume of the trunk when the trunk is closed or when it is unnecessary to use the device to assist in loading or unloading the trunk, while still having the actuating mechanism located between and within the upper and lower platforms.

Accordingly, it is an object of the present invention to provide an improved device to assist in loading and unloading objects into and from the trunk of an automotive vehicle.

More particularly, it is an object of the present invention to provide a device of the foregoing character that does not expose the fingers or hands of a user to pinch injuries resulting from contact with connected or closely adjacent mechanical elements while they are moving relative to one another.

It is further object of the present invention to provide a device of the foregoing character that is relatively compact and light-weight such that the device is portable.

It is yet a further object of the present invention to provide a device of the foregoing character which can increase its surface area once it is inserted within the trunk of the vehicle.

For a further understanding of the present invention and the objects thereof, attention is directed to the drawing and the following brief description thereof, to the detailed description of the preferred embodiment of the invention, and to the appended claims.

DETAILED DESCRIPTION OF THE PREFERRED EMBODIMENT

Figure 1:
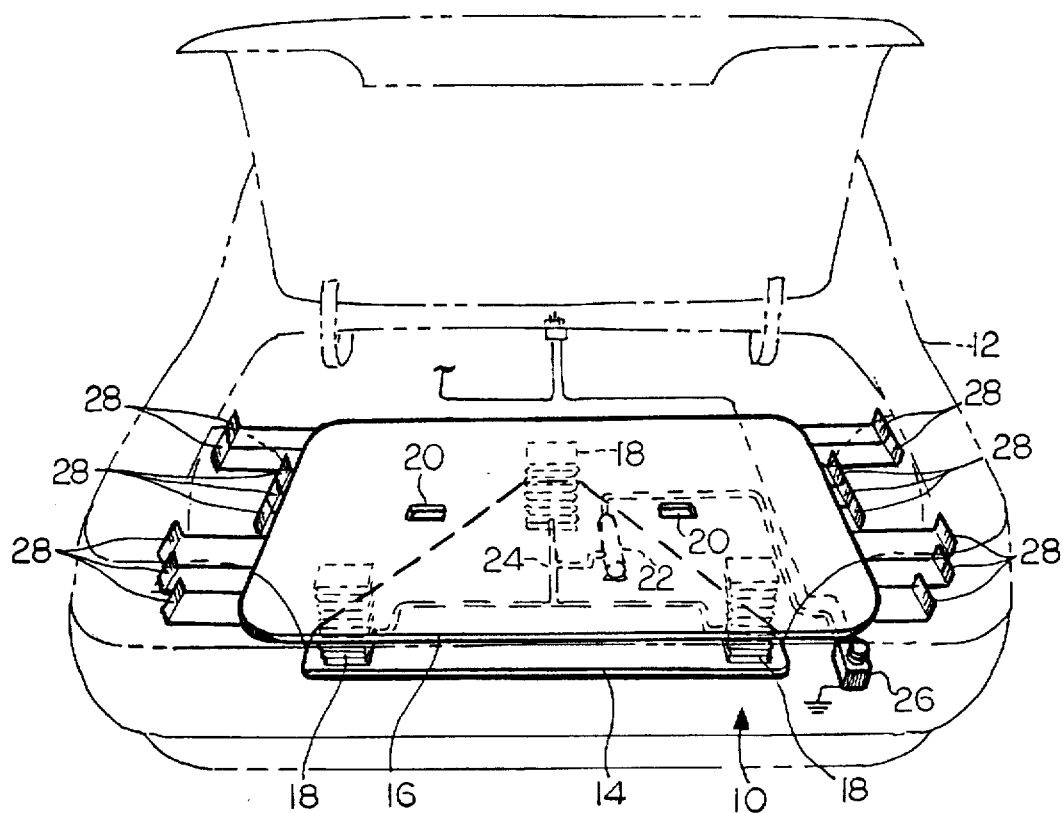
FIG. 1 is a perspective view of a device according to the preferred embodiment of the present invention installed in the trunk of an automotive vehicle.

A trunk loading and unloading device according to the preferred embodiment of the present invention is identified generally by reference numeral 10. The device 10 is shown as being installed in the trunk of an automotive vehicle 12, which is shown in broken line in FIG. 1. The device 10 includes a lower platform 14 that rests on the floor of the vehicle trunk, but may rest on a pad or other device which molds to the floor of the trunk, and an upper platform 16 that is spaced above the lower platform 14 and is supported on the lower platform 14 by three extensible pneumatic operators 18. The pneumatic operators are preferably a corrugated extensible bellow but may be any conventional pneumatic cylinder. The upper platform 16 is provided with a pair of hand engaging openings 20 to permit the device 10 to be manually inserted into and removed from the trunk of the vehicle 12.

The pneumatic operators 18 are simultaneously pressurized by compressed air received from an accumulator 22 through a piping system 24, the accumulator 22 receiving compressed air from an electric air pump 26. When the pneumatic operators 18 are pressurized, the upper platform 16 will be elevated to the position shown in solid line in FIG. 2, which, preferably, will be six to nine inches above the level of the lower platform 14 or approximately level with the opening of the trunk. In this position, it will be possible to slide heavy objects onto the upper platform 16 without the need to lift any of such objects above the elevation of adjacent structure at the rear of the vehicle 12 nor lower any such objects onto the floor of the trunk. When the vehicle 12 is properly loaded, a valve, not shown, is opened by a switch, to allow the upper platform 16 to descend to its rest position, illustrated by broken line in FIG. 2, which is preferably only one and one-half to two and one-half inches above the level of the lower platform 14. Thus, the device 10 will not unduly limit the volume of the trunk 12 when the trunk of the vehicle 12 is closed or when the device 10 is otherwise not in use.

To permit the device 10 to fit within the trunk of vehicle 12 of various sizes, while not unduly limiting the supporting surface area of the upper platform 16, each of the opposed sides of the upper platform 16 is provided with a multitude of slides 28 that are slidably connected to the upper platform 16. By selectively moving the slides 28 in and out with respect to the upper platform 16, the articles supporting surface area of the upper platform 16 can be increased or decreased as needed, yet the surface area of the upper platform 16 with all of the slides 28 in their innermost positions can be kept small enough to permit a device 10 to be inserted into the trunk of a vehicle 12 of a very small size, such as a vehicle of the subcompact class.

While it is possible to have a single large slide (not shown) it is preferable to have a multitude of slides 28 to allow the user to conform the slides 28 to the shaped sides of the trunk. This allows for maximum utilization of the surface area of the upper platform 16.

In operation, with the vehicle 12 in a stopped position, its trunk is opened using any known means such as by use of a key or in a known keyless entry manner. The vehicle operator then activates a switch, not shown, to release compressed air in the accumulator 22 to flow through the piping system 24 into the pneumatic operators 18 to elevate the upper platform 16 relative to the lower platform 14 to the position of the upper platform 16 that is shown in solid line in FIG. 2. The operator can then load or unload objects onto or from the upper platform 16 by a sliding action without the need to reach lower into the trunk.

Figure 2:
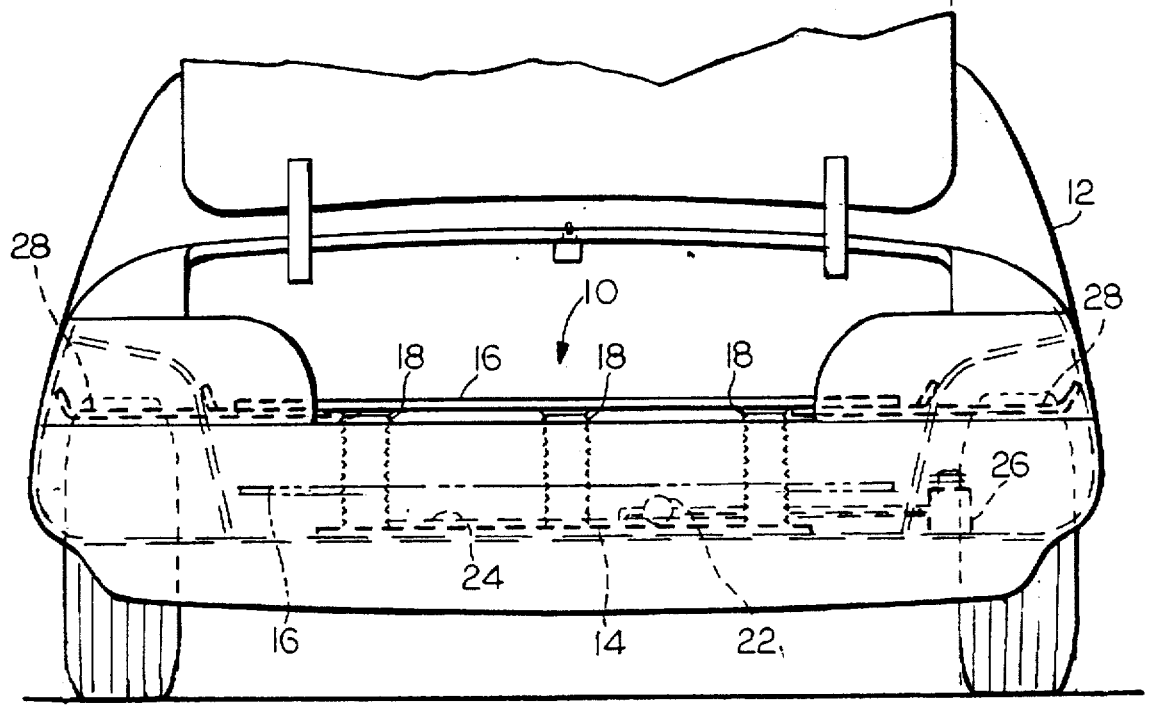
FIG. 2 is a fragmentary end elevational view of an automotive vehicle with a device according to the preferred embodiment of the present invention installed in its trunk.

Thereupon, the pneumatic operators 18 are depressurized, as heretofore described, to permit the upper platform 16 to drop to the position illustrated in broken line in FIG. 2, whereupon the trunk of the vehicle 12 is closed (not shown). Preferably, the accumulator 22 is recharged upon the closing of the trunk of the vehicle 12, in which case a safety switch, not shown, is provided to prevent the pressurization of the pneumatic operators 18 until the trunk of the vehicle 12 is reopened.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. Method of loading or unloading objects into a trunk compartment of an automotive vehicle, said method comprising the steps of:

providing a device having a generally horizontally extending lower platform supported on a floor of the trunk compartment of the vehicle, a generally horizontally extending upper platform positioned above the lower platform, and a spaced apart plurality of vertically extensible pneumatic operators supporting the upper platform on the lower platform;

simultaneously pressurizing each of the pneumatic operators to raise the upper platform with respect to the lower platform to a level where objects can be inserted into the trunk or removed from the trunk by a sliding action without the need to lift any of the objects above any structure of the vehicle;

introducing an object into the trunk compartment of the vehicle or removing an object from the trunk compartment of the vehicle by sliding the object across the upper platform; and depressurizing each of the pneumatic operators to permit the level of the upper platform to fall with respect to the level of the lower platform.

2. A method according to claim 1 wherein each of an opposed pair of edges of the upper platform is provided with a plurality of slides, each of the slides of each plurality of slides being extensible from the upper platform in a generally horizontal plane to increase the area of the upper platform; and increasing the surface area of the upper platform by extending each of the slides in each of the plurality of slides with respect to the upper platform.

* * * * *